United States Patent [19]

Huggins

[11] Patent Number: 5,489,184
[45] Date of Patent: Feb. 6, 1996

[54] PELLET LOADER

[75] Inventor: Thomas B. Huggins, Columbia, S.C.

[73] Assignee: Westinghouse Electric Corporation, Pittsburgh, Pa.

[21] Appl. No.: 304,897

[22] Filed: Sep. 13, 1994

[51] Int. Cl.⁶ .................................................. B65B 5/06
[52] U.S. Cl. .............................. 414/626; 53/245; 53/247; 294/103.1; 294/113
[58] Field of Search .......................... 53/541, 245, 247, 53/475; 294/103.1, 103.2, 104, 113; 414/792.9, 786, 626

[56] References Cited

U.S. PATENT DOCUMENTS

| | | | |
|---|---|---|---|
| 4,493,604 | 1/1985 | Walker | 414/622 |
| 4,563,031 | 1/1986 | Kishimoto et al. | 294/81.21 |
| 4,566,835 | 1/1986 | Raymond et al. | 53/245 |
| 4,758,036 | 7/1988 | Legille et al. | 294/104 |
| 4,863,204 | 9/1989 | Peters | 294/19.1 |
| 5,161,934 | 11/1992 | Richardson | 414/621 |
| 5,169,284 | 12/1992 | Berger et al. | 414/796.9 |
| 5,253,974 | 10/1993 | Williams | 414/623 |

*Primary Examiner*—Michael S. Huppert
*Assistant Examiner*—Janice L. Krizek

[57] ABSTRACT

A loading device for picking up and repositioning a plurality of upright cylinders arranged in a rectangular array includes a rectangular-shaped frame and a lift mechanism for raising and lowering the frame. A first fixed wall depends from a first end of the frame, and a second fixed wall depends from a second end of the frame adjacent the first end. A first movable wall adjacent a third end of the frame opposes the first fixed wall, and a second movable wall adjacent a fourth end of the frame opposes the second fixed wall. The first and second fixed walls and the first and second movable walls surround a rectangular-shaped enclosed area. A first motive mechanism couples the frame and the first movable wall for moving the first movable wall in a first direction, normal to the first fixed wall, for clamping the array between the first movable wall and the first fixed wall while maintaining the first movable wall vertical. A second motive mechanism couples the frame and the second movable wall for rotating the second movable wall about an axis of rotation parallel to the first direction for clamping the array between the second movable wall and the second fixed wall. A resilient surface on at least one of the walls enables the device to gently load fissile fuel pellets having an annular cross section into a sintering boat.

18 Claims, 4 Drawing Sheets

PELLET LOADER

BACKGROUND OF THE INVENTION

1. Field of the Invention

This invention relates to pellet loading devices, and, in particular, to a loader for picking up a rectangular-shaped, single layer, square lattice array of upright cylindrical fuel pellets and for placing the array of pellets into a container.

2. Description of the Prior Art.

Uranium oxide fuel pellets for use in nuclear reactors are formed by compressing uranium oxide powder into a dense right cylindrical-shaped pellet form having a packing fraction of about 95%, and then sintering the pellet. The sintering step is typically performed by loading several layers of the pellets in a rectangular-shaped sintering boat, wherein the upright pellets of each layer are adjacently packed in a square lattice array having a rectangular-shaped perimeter. The loaded sintering boat is then heated in a hydrogen atmosphere. An automated device used for loading the pellets into and out of the sintering boat includes a manifold and vacuum head connecting to a planar array of vacuum cups. The cups are lowered onto the top of a similarly arranged planar array of fuel pellets, wherein each pellet is standing on end on a table. Vacuum is simultaneously applied to each of the vacuum cups to enable the device to hold and lift all of the pellets in the array in unison. The array of pellets can then be placed on the bottom of the sintering boat as an array. The vacuum is then reduced, the array of vacuum cups is raised out of the sintering boat and the process is repeated to add more layers, with each additional array of pellets placed atop the previously placed layer in the sintering boat. An important design consideration for the loading device is to be able to maximize the number of pellets loaded into the sintering boat in each layer, while still being able to be cleanly inserted into and retracted from the sintering boat.

In recent years the nuclear industry has begun to use fuel rods that contain pellets having an annular-shaped cross section. Obviously, it would be difficult to pick up an array of such hollow core pellets with the prior art vacuum loading device. Presently, the only method of loading annular-shaped fuel pellets is by hand loading which is undesirable from a health physics standpoint. Therefore, there is a need for a new type of automated loading device that can pick up a square lattice array of cylindrical-shaped fuel pellets, each having an annular-shaped cross section, and place them in a sintering boat of the type currently used without requiring human handling and without damaging the pellets, wherein the number of pellets in the array is maximized.

In addition, present art pellet loaders are expensive and complicated. They require frequent cleaning because the vacuum lines connecting the vacuum head to the vacuum cups tend to clog with uranium oxide powder or other debris. The vacuum pumps must be qualified for use in the nuclear industry, adding further expense. Therefore, there is also a need for a less expensive and less complicated alternative to present art loading devices for use with solid cylindrical pellets.

SUMMARY OF THE INVENTION

These needs and others are satisfied according to the present invention for a loading device that is capable of picking up plurality of upright cylindrical elements arranged in a square lattice array having a rectangular-shaped perimeter and repositioning the array on a flat surface. The loading device is especially suited to automated loading of fissile fuel pellets, such as those fabricated from uranium oxide, having an annular-shaped cross section, into a deep, rectangular-shaped sintering boat without damaging the pellets.

The device includes a frame that is preferably substantially rectangular-shaped, and a lift mechanism coupled to a top side of the frame by an upright member for raising and lowering the frame. A first fixed wall depends about vertically from a first peripheral end of the frame, and a second fixed wall depends about vertically from a second peripheral end of the frame adjacent the first peripheral end. A first movable wall adjacent a third peripheral end of the frame opposes the first fixed wall, and a second movable wall adjacent a fourth peripheral end of the frame opposes the second fixed wall. The second movable wall includes a pivot connection to the frame defining an axis of rotation parallel to the fourth peripheral end. The first and second fixed walls and the first and second movable walls together surround an about rectangular-shaped enclosed area. A first motive mechanism couples the frame and the first movable wall for moving the first movable wall in straight line motion in a first direction about parallel to the axis of rotation and about normal to the first movable wall, towards and away from the first fixed wall, while preferably maintaining the first movable wall in an about vertical orientation. A second motive mechanism couples between the frame and the second movable wall, preferably by a pivot arm extending from the second movable wall, for rotating the second movable wall about the axis of rotation such that a bottom end of the second movable wall distal the frame rotates in an arc toward and away from the second fixed wall. About simultaneous movement of the first and second movable walls towards an array of cylindrical elements in the enclosed area creates a pincer effect that gently but firmly grasps the array.

According to another aspect of the invention, at least one of the first fixed wall, the first movable wall, the second fixed wall and the second movable wall includes a resilient pad facing the enclosed area.

According to another aspect of the invention, the first and second motive mechanisms include first and second linear actuators, respectively, preferably pneumatic air cylinders, that can each be controlled by an automated system. Each actuator includes a fixed end coupled to the frame and a movable end coupled to one of the movable walls.

According to another aspect of the invention, the first actuator controlling movement of the first movable wall is aligned about horizontally in the long direction of the frame. The second actuator controlling movement of the second movable wall is aligned about vertically, being coupled at one end to the upright and at the other end to the pivot arm, wherein each coupling is preferably articulated to compensate for the arcuate motion of the pivot arm.

According to another aspect of the invention, the frame includes a fixed plate, preferably rectangular-shaped, having a bottom surface facing the enclosed area. The first motive mechanism can include an alignment system, including a slide member that is rigidly coupled to the movable end of the first air actuator and to the first movable wall. The slide member, which can be a flat plate, is kept in sliding contact with the bottom surface as the first movable wall is moved, keeping the first movable wall about vertical and parallel to the first fixed wall. The alignment system preferably includes a plurality of elongated aligners, each coupled to the plate at a fixed location and supporting the slide plate in sliding contact with the fixed plate. For example, the aligners can be loose fasteners, such as bolts and nuts wherein each bolt extends through a hole in the fixed plate and through a slot in the slide member such that the slide member can slide back and forth about the length of each slot.

According to another aspect of the invention, each of the first motive mechanism, the second motive mechanism and the lift mechanism can be operatively coupled to an automated system.

The invention also includes a method of loading a sintering boat with a plurality of upright, cylindrical-shaped fissile fuel pellets. The method includes the to steps of: arranging the fuel pellets on a first upward facing surface in a square lattice array having a rectangular-shaped perimeter; first clamping a first pair of peripheral spaced apart sides of the array between an about vertically extending first fixed wall and a first movable wall parallel to and opposing the first fixed wall, including the step of moving the first movable wall rectilinearly in a first direction being about normal to the first fixed wall towards the first fixed wall; second clamping a second pair of peripheral spaced apart sides of the array between an about vertically extending second fixed wall and a second movable wall about parallel to and opposing the second fixed wall about simultaneously with the first clamping, including the step of rotating the second movable wall towards the second fixed wall about an axis parallel to the first direction towards the second fixed wall; lifting the array off of the first upward facing surface with a lift mechanism coupled to the first and second fixed walls and the first and second movable walls; lowering the array onto a second upward facing surface within the sintering boat with the lift mechanism; and releasing the array, including the steps of moving the first movable wall away from the first fixed wall and rotating the second movable wall away from the second fixed wall. The steps of first clamping, second clamping, lifting, lowering and releasing can be controlled by an automated system operatively coupled to the first movable wall, the second movable wall, and the lift mechanism.

According to another feature, the invention encompasses a method of moving a plurality of upright, cylindrical-shaped elements, such as, for example, fissile uranium oxide fuel pellets, arranged in an array having a rectangular-shaped perimeter initially positioned on a first upward facing surface. The method includes the steps of: providing a loading device as described hereinbefore; positioning the enclosed area over the array; first lowering the frame with the lift means such that the array is in the enclosed area, surrounded by the first and second fixed walls and the first and second movable walls; clamping the array by rectilinearly moving the first movable wall towards the first fixed wall with the first motive means while simultaneously rotating the second movable wall towards the second fixed wall with the second motive means; first lifting the frame with the lift means while clamping the array; positioning the frame over a second upward facing surface, such as the interior bottom surface of a sintering boat; second lowering the frame towards the second upward facing surface until the array rests upon the second upward facing surface; releasing the array by moving the first movable wall away from the array with the first motive means while about simultaneously rotating the second movable wall away from the array with the second motive means; and second lifting the frame away from the array with the lift means. The steps of first lowering the frame, clamping the array, first lifting the frame, second lowering the frame, releasing the array and second lifting the frame can be controlled by an automated system operatively coupled to the first motive means, the second motive means, and the lift means. The process can be repeated to place a second array of pellets on top of the first array of pellets, wherein the top surface of the pellets of the first array become a new upward facing surface for placing the second array atop.

It is an object of the invention to provide a mechanically simple and inexpensive loader capable of lifting and repositioning a rectangular-shaped, square lattice array of delicate, upright cylindrical objects.

It is another object of the invention to provide a fuel pellet loader and method for using the fuel pellet loader in the nuclear industry for automated loading of cylindrical-shaped fuel pellets into a sintering boat.

It is another object of the invention to provide a fuel pellet loader and method for picking up and repositioning an array of annular-shaped fuel pellets.

It is yet another object of the invention to provide a fuel pellet loader for the nuclear fuel industry that does not require vacuum equipment and therefore does not suffer the disadvantages of the prior art devices.

These and other objects will be more fully understood from the following description of the invention with reference to the illustrations appended hereto.

DESCRIPTION OF THE PREFERRED EMBODIMENTS

Figure 1:
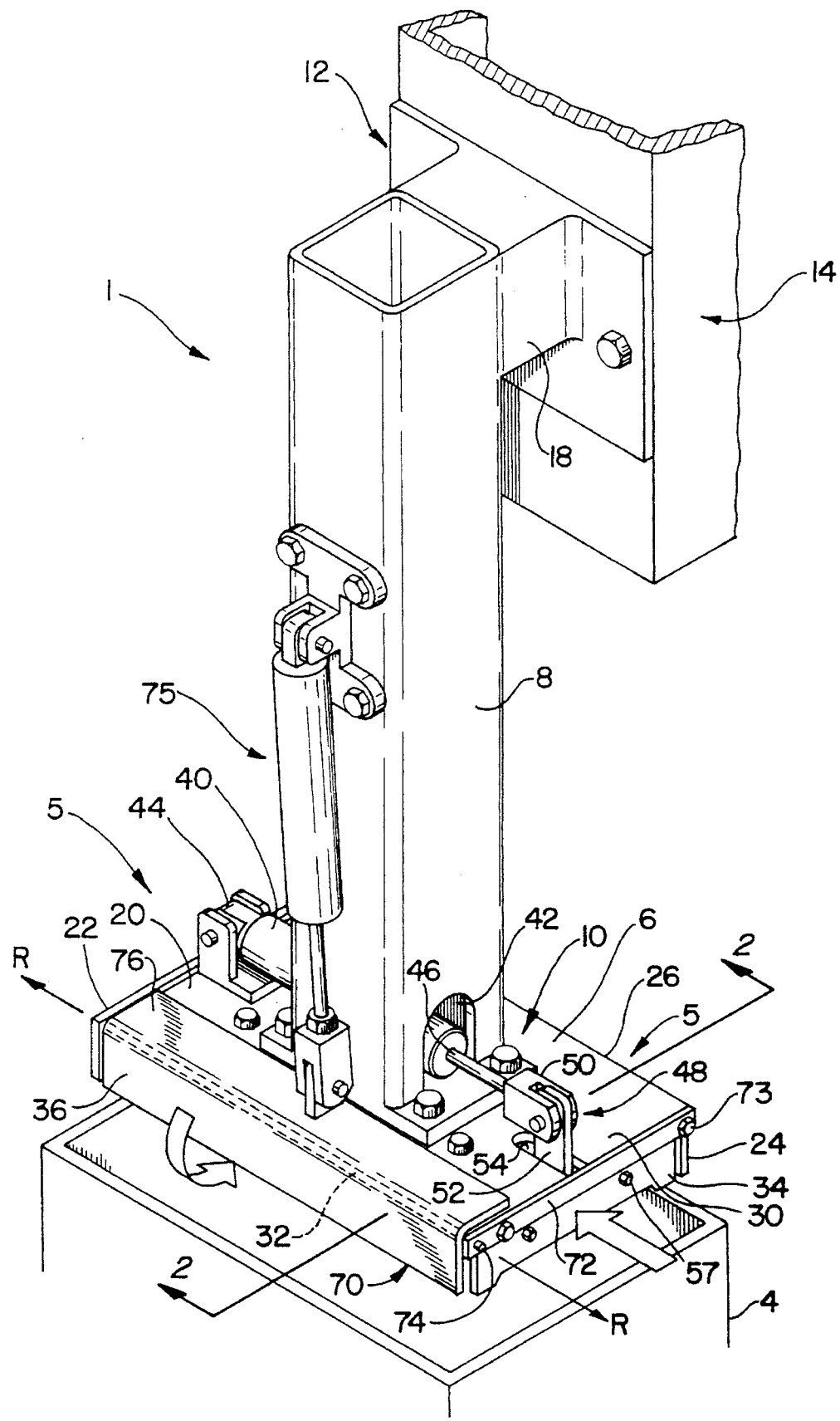
FIG. 1 is a perspective view of a pellet loader according to the invention.
Figure 2:
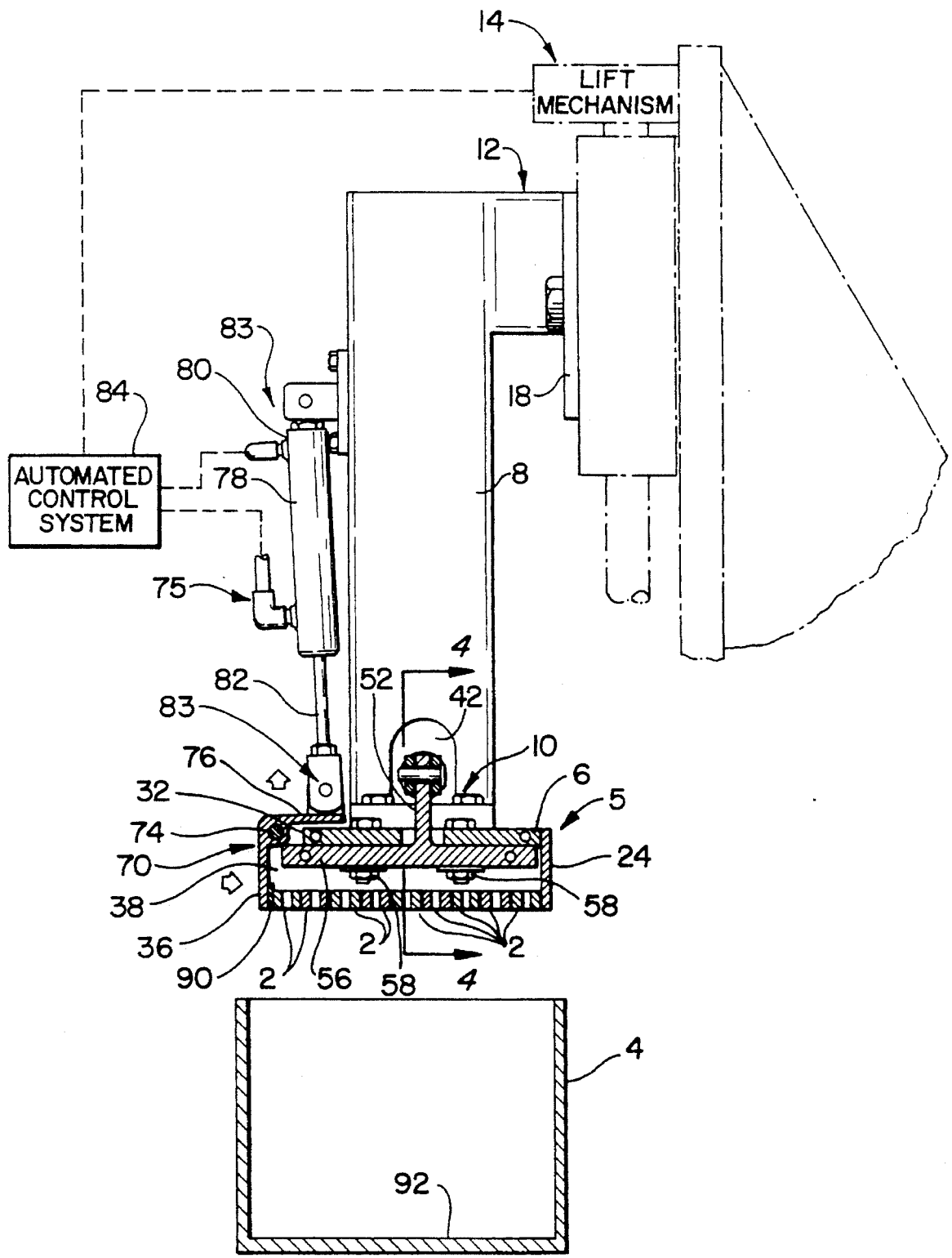
FIG. 2 is a side view of the pellet loader of FIG. 1 in partial cross section through line 2—2 of FIG. 1.
Figure 3:
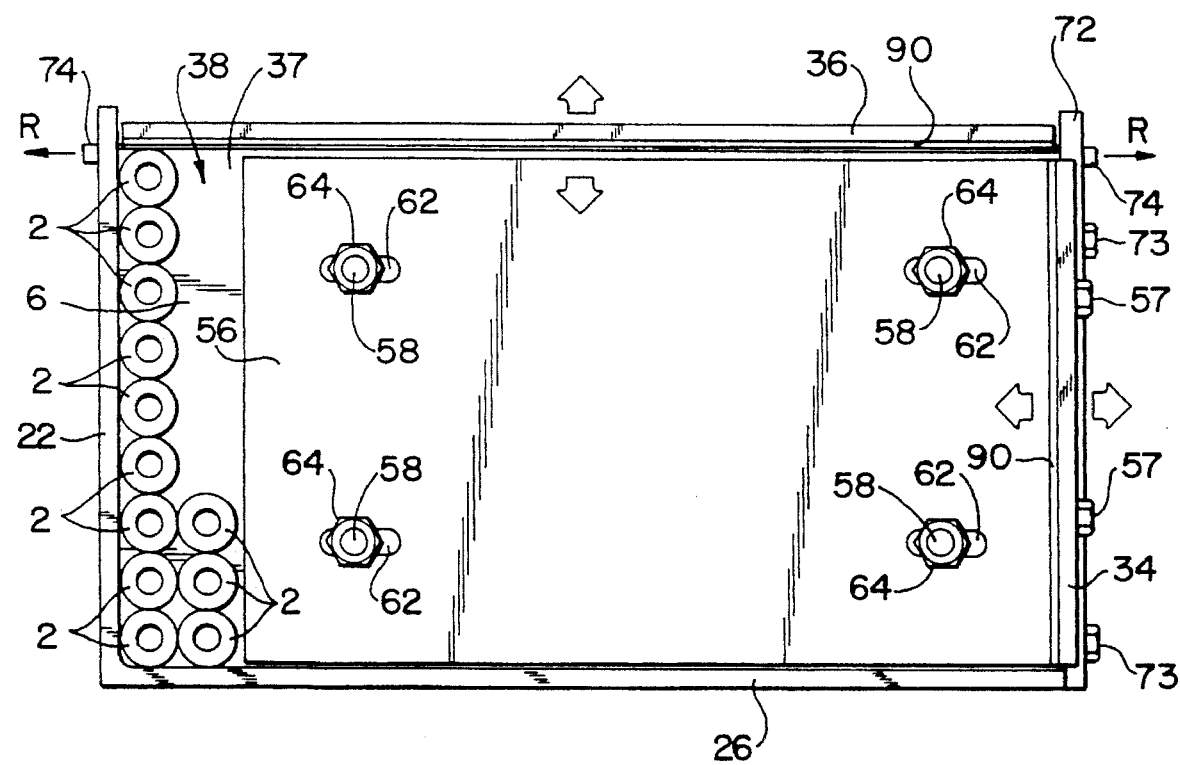
FIG. 3 is a bottom plan view of the pellet loader of FIG. 1, wherein only a few fuel pellets are shown.
Figure 4:
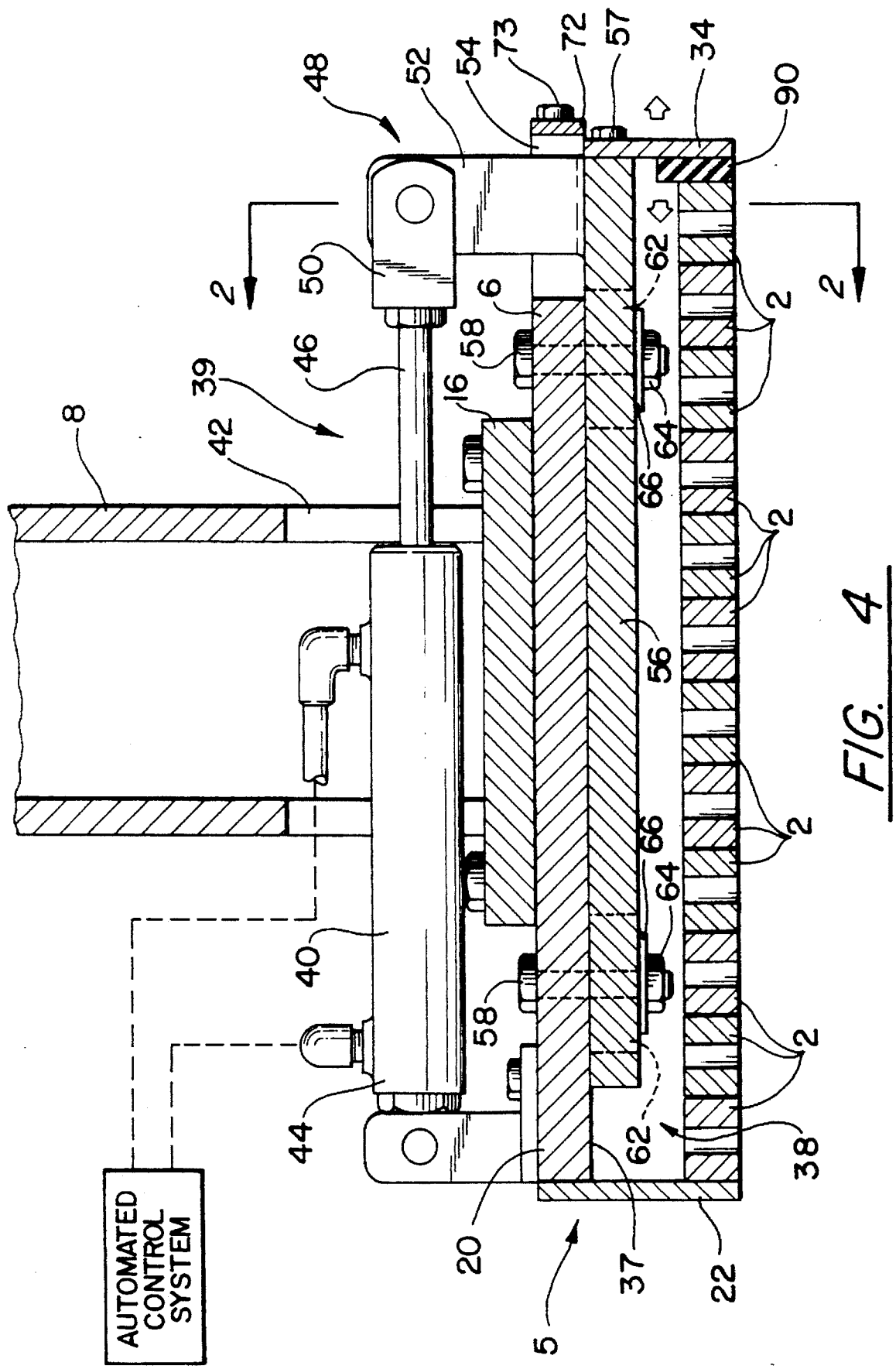
FIG. 4 is a cross section detail through line 4—4 of FIG. 2.

FIGS. 1 through 4 illustrate various views of a practical embodiment of a pellet loader 1 of the invention gripping a plurality of annular-shaped, right cylindrical fuel pellets 2 arranged in a square lattice array 3, partially shown in FIG. 3 to reveal other structure. The loader 1 is capable of smoothly loading the array 3 into a deep, rectangular-shaped sintering boat 4 (partially shown in FIG. 1) or other container. A frame 5 at a bottom end of the pellet loader 1 includes a horizontally oriented, fixed, rectangular-shaped plate 6 that serves as a platform for other components. An upright member 8, preferably fabricated from a square pipe, is rigidly connected at its bottom end to the top side of the rectangular-shaped plate 6 by a first mounting arrangement 10, and is rigidly coupled by a second mounting arrangement 12 at its upper end to a lift mechanism 14 for raising and lowering the frame 5. The first arrangement 10 may include a plate 16 that is welded to the upright member 8 and bolted to the rectangular-shaped plate 6, or any other convenient, rigid attachment mechanism. The lift mechanism 14 can be provided by a variety of well-known devices that can be automatically controlled, such as a hydraulically, pneumatically or electrically powered lift system, and the second mounting arrangement 12 can include a bracket 18 welded to the upright 8.

Attached to and depending down from a first peripheral end 20 of the rectangular-shaped plate 6 is a first fixed wall 22. A second fixed wall 24 is attached to and depends down from a second peripheral end 26 of the rectangular-shaped plate 6, adjacent the first fixed wall 22. The first and second fixed walls 22, 24 can be connected to the rectangular-shaped plate 6 by a variety of well-known connection means, for example, by welds or with fasteners such as screws (not shown). Adjacently located at the third peripheral end 30 and the fourth peripheral end 32 of the rectangular-shaped plate 6 are a first movable wall 34 and a second movable wall 36 respectively. The first and second fixed walls 22, 24 and the first and second movable walls 34, 36 surround a rectangular-shaped area or enclosure 38 underneath a bottom surface 37 of the rectangular-shaped plate 6, wherein the first fixed wall 22 and the first movable wall 34 are on the short sides of the enclosure 38.

The first movable wall 34 is movable in a first direction normal to a plane defined by the first movable wall. A first motive mechanism 39 for moving the first movable wall 34 in rectilinear, straight line motion includes a first linear actuator, preferably provided by a first pneumatic air cylinder 40 that extends horizontally through a hole 42 in the upright member 8 near its bottom end. A first end 44 of the first air cylinder 40 is rigidly mounted to the rectangular-shaped plate 6 near the first peripheral end 20. A movable second end 46 of the first air cylinder 40 is coupled to the first movable wall 34 by a first coupling 48. The first coupling 48 can include a first connecting member 50 attached to the movable second end 46 of the first air cylinder 40 and also connected to a second connecting member 52 extending through a slot 54 in the rectangular-shaped plate 6. The second connecting member 52 connects to a slide member, preferably a slide plate 56 positioned adjacently below the bottom surface 37 of the rectangular-shaped plate 6 that is used for aligning the first movable wall 34. The first movable wall 34 is fastened to an edge of the slide plate 56, for example, by a weld or fasteners, such as screws 57. Four bolts 58, or aligners, preferably extend through holes in the rectangular-shaped plate 6 and through slots 62 aligned in parallel with each other in the slide plate 56. In the embodiment illustrated in the drawings, the bolts 58 are loosely held with nuts 64 and washers 66. This mechanism keeps the first movable wall 34 in about vertical alignment and restricts the range of movement of the first movable wall 34 to about the length of the slots 62 in the first direction.

The second movable wall 36 is defined by an about vertically extending leg of an L-shaped member 70 pivotally connected between an end of the first fixed wall 22 and an end bar 72 attached to the third peripheral end 30 by fasteners 73. A pivot connection 74 defines an axis of rotation R of the second movable wall 36 parallel to the first direction and spaced from the fourth peripheral end 32 of the rectangular-shaped plate 6. A pivot arm 76 is defined by an about horizontally extending leg of the L-shaped member 70 positioned above the rectangular-shaped plate 6. The second movable wall 36 is rotated by a second motive mechanism 75 that includes a second linear actuator, preferably provided by second pneumatic air cylinder 78, coupled between the frame 5 and the pivot arm 76. The second air cylinder 78 is preferably about vertically aligned, having a first end 80 rigidly connected to the upright member 8, and a second movable end 82 coupled to the pivot arm 76. Each of the couplings to the upright member 8 and to the pivot arm 76 are preferably articulated connections 83, as illustrated, to compensate for the arcuate movement of the pivot arm 76.

While the actuators used in the first and second motive mechanisms 39, 75 described herein are preferably linear actuators in the form of air cylinders, the invention also encompasses electric, electromagnetic and hydraulic linear actuators.

In a preferred embodiment of the invention, each of the first and second air cylinders 40, 78 have a 9/16 inch bore and a 1 inch stroke. A greater force can be obtained with cylinders having a 3/4 inch bore. For purposes of loading uranium oxide fuel pellets into a sintering boat, each of the first and second movable walls 34, 36 need only move 1/8–3/16 inch, therefore air cylinders with a shorter stroke can also be used. The stroke of larger air cylinders can also be restricted by mechanical stops to, for example, 1/4 inch or less. Preferably, each of the first and second air cylinders is pneumatically connected to a control system 84 that is preferably but not necessarily automated, of a type well-known in the art, for controlling movement of each of the first and second movable walls. The lift mechanism 14 is also preferably controlled via the control system 84, especially when automated.

It is preferred that the loading device be capable of loading cylindrical-shaped and annular-shaped uranium oxide fuel pellets 2 into a rectangular-shaped sintering boat. A sintering boat in common use is about 8.5 inches long by 5.5 inches wide, therefore the frame 5, movable walls 34, 36 and motive mechanisms 39, 75 must be able to fit inside this limited area while maximizing the number of fuel pellets loaded into the sintering boat. To this end, the alignment of the first and second air cylinders 40, 78 herein described are important in keeping the size of the frame 5 such that it can be lowered into a rectangular-shaped sintering boat of the type currently used, while maximizing the available space in the enclosed area 38 such that the number of fuel pellets 2 in the array 3 can be maximized.

The fuel pellets can be fabricated in different sizes. The diameters of pellets in common use range between 0.375 inches and 0.50 inches. If the pellets have an annular cross section, the inner diameter ranges from 0.187–0.220 inches. The height of each pellet is about 1.2 times the diameter. A prime design consideration is that the frame 5 and the movable walls 34, 36 must be small enough to fit into the sintering boat 4 without hitting the walls of the sintering boat. This limits the size of the enclosed area 38. Therefore, depending upon the diameter of the fuel pellets 2, between 10–13 rows and 16–21 columns of pellets 2 can fit in the enclosed area 38 in a square lattice array.

Before sintering, the uranium oxide fuel pellets 2, which are formed by compressing uranium oxide powder in a pellet press, can be damaged by an excessive force applied to their sides by the movable walls 34, 36. Therefore, it has been found that it is advantageous to use a resilient surface, preferably a free surface of a strip 90 or pad that is affixed to at least one of the walls facing the array, and preferably locating a resilient strip 90 on the second movable wall 36. Resilient strips are shown in the drawings on each of the first and second movable walls 34, 36.

A rectangular-shaped array 3, consisting of a plurality of similar sized, upright, cylindrical elements, such as fissile fuel pellets 2, that is initially positioned on a first upward facing surface, such as a table top, can be moved with the loader 1 herein described by first positioning the enclosed area 38 of the loading device over the array 3, and then lowering the frame 5 of the loading device 1 over the array 3 such that the array is within the enclosed area 38. A first pair of parallel, spaced apart peripheral sides of the array 3 is clamped by moving the first movable wall 34 rectilinearly in the first direction towards the first fixed wall 22 with the first motive mechanism 39. A second pair of parallel, spaced apart peripheral walls of the array 3 is about simultaneously clamped by rotating the second movable wall 36 towards the second fixed wall 24 with the second motive mechanism 75. The clamped array 3 is then lifted along with the frame 5 with the lift mechanism 14. The frame 5 is then positioned over a second upward facing surface, such as a bottom interior surface 92 of the sintering boat 4. The frame 5 along with the clamped array 3 is then lowered towards the second upward facing surface until the array 3 rests upon the second upward facing surface. The array 3 is released by moving the first movable wall 34 away from the array 3 with the first motive means 39 while rotating the second movable wall 36 away from the array 3 with the second motive means 75. The frame 5 can then be lifted away from the array 3 with the lift mechanism 14. A second array can be loaded on top of the first array by repeating the process, using the top of the first array as an upward-facing surface to place the second array atop.

The loader and method of the invention are especially useful for loading a sintering boat with a plurality of right cylindrical-shaped fuel pellets having an annular-shaped cross section. The sintering boat can be automatically loaded without human handling with a device that is simple, inexpensive, and not requiring costly maintenance as are the vacuum-assisted devices of the prior art.

Whereas particular embodiments of the present invention have been described above for purposes of illustration, it will be appreciated by those skilled in the art that numerous variations of the details may be made without departing from the invention as described in the appended claims.

I claim:

1. A loading device for picking up a plurality of upright cylindrical-shaped elements adjacently arranged in an array having a rectangular-shaped perimeter from an upward facing first surface and placing the array on an upward facing second surface, comprising:

a substantially rectangular-shaped frame, including a first fixed wall depending from a first peripheral end and a second fixed wall depending from a second peripheral end adjacent the first peripheral end;

lift means coupled to the frame for raising and lowering the frame;

a first movable wall adjacent a third peripheral end of the frame and opposing the first fixed wall;

a second movable wall adjacent a fourth peripheral end of the frame, opposing the second fixed wall and having a pivot connection to the frame defining an axis of rotation extending in a first direction parallel to the fourth peripheral end, the first and second fixed walls and the first and second movable walls defining an about rectangular-shaped enclosed area therebetween;

first motive means coupling between the frame and the first movable wall for moving the first movable wall in generally straight line motion in the first direction towards and away from the first fixed wall while maintaining the first movable wall in a plane about parallel to a plane defined by the first fixed wall; and second motive means coupling between the frame and the second movable wall for rotating the second movable wall about the axis of rotation such that a bottom end of the second movable wall distal the frame moves toward and away from the second fixed wall.

2. The loading device of claim 1, wherein the first motive means comprises a first linear actuator operatively coupling between the frame and the first movable wall and the second motive means comprises a second linear actuator operatively coupling between the frame and the second movable wall.

3. The loading device of claim 2, wherein the second motive means includes a pivot arm extending from the second movable wall, wherein an upright member couples between the frame and the lift means, and wherein the second linear actuator is substantially vertically aligned and positioned above the frame, comprising a first end connected to the upright member and a second movable end coupled to the pivot arm.

4. The loading device of claim 3, wherein the first linear actuator is aligned about in parallel with the first direction.

5. The loading device of claim 4, wherein a range of motion of at least one of the first movable wall and the second movable wall is limited to about ⅜ inch or less.

6. The loading device of claim 3, wherein the first linear actuator and the second linear actuator are each operatively connected to an automated system for controlling movement of each of the first movable wall and the second movable wall.

7. The loading device of claim 6, wherein the lift means is operatively connected to the automated system for controlling the raising and the lowering of the frame.

8. The loading device of claim 3, wherein at least one of the first fixed wall, the first movable wall, the second fixed wall and the second movable wall includes a resilient surface facing the enclosed area.

9. The loading device of claim 1, wherein the frame includes a fixed plate having a bottom surface facing the enclosed area, and wherein the first motive means includes an alignment arrangement comprising a slide member coupled to the first movable wall and means for maintaining the slide member in sliding contact with the bottom surface.

10. The loading device of claim 9, wherein the second movable wall is defined by a vertically extending leg of an elongated, L-shaped member, and an about horizontally extending arm of the L-shaped member defines a pivot arm for coupling to the second motive means.

11. The loading device of claim 3, wherein the elements of the array are arranged in a square lattice.

12. The loading device of claim 11, wherein each of the elements has an annular-shaped cross section.

13. A pellet loader for loading a sintering boat with a single layer array comprising a plurality of cylindrical-shaped fissile fuel pellets, the pellet loader comprising:

a rigid frame, including a generally rectangular-shaped plate having a downward facing bottom surface, a first fixed wall depending from a first peripheral end of the plate, and a second fixed wall depending from a second peripheral end of the plate adjacent the first peripheral end;

lift means for lifting and lowering the frame coupled to an upper side of the plate by an upright;

a first movable wall adjacent a third peripheral end of the plate;

an elongated, L-shaped member adjacent a fourth peripheral end of the frame having a pivot connection to the frame defining an axis of rotation extending in a first direction about normal to the first fixed wall, the L-shaped member including an about horizontally extending first leg adjacent the upper side of the plate defining a pivot arm, and an about vertically depending second leg defining a second movable wall opposing the second fixed wall, wherein a generally rectangular-shaped, open-bottomed region is defined by the bottom surface, the first and second fixed walls and the first and second movable walls;

first motive means including a first linear actuator operatively coupling between the frame and the first movable wall for moving the first movable wall rectilinearly in about the first direction;

second motive means including a second linear actuator operatively coupling between the frame and the pivot arm for rotating the second movable wall about the axis of rotation such that a bottom end of the second movable wall distal the frame moves toward and away from the second fixed wall; and a control system operatively connected to each of the first and second linear actuators for controlling movement of the first movable wall and the second movable wall, and operatively connected to the lift means for controlling the lifting and lowering of the frame.

14. The pellet loader of claim 13, wherein the second linear actuator is substantially vertically aligned and positioned above the frame, comprising a first end connected to the upright member and a second movable end coupled to the pivot arm, and wherein the first linear actuator is aligned about in parallel with the first direction.

15. A method of moving a plurality of upright, cylindrical-shaped elements arranged in an array having a rectangular-shaped perimeter initially positioned on a first upward facing surface, comprising the steps of:

providing the loading device of claim 1, positioning the enclosed area over the array;

first lowering the frame with the lift means such that the array is in the enclosed area;

clamping the array by rectilinearly moving the first movable wall towards the first fixed wall with the first motive means while simultaneously rotating the second movable wall towards the second fixed wall with the second motive means;

first lifting the frame with the lift means while clamping the array;

positioning the frame over a second upward facing surface;

second lowering the frame towards the second upward facing surface until the array rests upon the second upward facing surface;

releasing the array by moving the first movable wall away from the array with the first motive means while about simultaneously rotating the second movable wall away from the array with the second motive means; and second lifting the frame away from the array with the lift means.

16. The method of claim 15, wherein the steps of first lowering the frame, clamping the array, first lifting the frame, second lowering the frame, releasing the array and second lifting the frame are controlled by an automated system operatively coupled to the first motive means, the second motive means, and the lift means.

17. A method of loading a sintering boat with a plurality of upright, cylindrical-shaped fissile fuel pellets, comprising the steps of:

arranging the fuel pellets in a square lattice array having a rectangular-shaped perimeter;

first clamping a first pair of peripheral spaced apart sides of the array between an about vertically extending first fixed wall and a first movable wall parallel to and opposing the first fixed wall, including the step of moving the first movable wall rectilinearly in a first direction extending about normal to the first fixed wall towards the first fixed wall;

second clamping a second pair of peripheral spaced apart sides of the array between an about vertically extending second fixed wall and a second movable wall about parallel to and opposing the second fixed wall about simultaneously with the first clamping, including the step of rotating the second movable wall towards the second fixed wall about an axis parallel to the first direction;

lifting the array with a lift mechanism coupled to the first and second fixed walls and the first and second movable walls;

lowering the array onto an upward facing surface within the sintering boat with the lift mechanism; and releasing the array, including the steps of moving the first movable wall away from the first fixed wall and rotating the second movable wall away from the second fixed wall.

18. The method of claim 17, wherein the steps of first clamping, second clamping, lifting, lowering and releasing are controlled by an automated system operatively coupled to the first movable wall, the second movable wall, and the lift mechanism.

* * * * *